United States Patent [19]
Humpherys

[11] 3,950,704
[45] Apr. 13, 1976

[54] VIDEO RETIMER SYSTEM

[75] Inventor: Bernarr H. Humpherys, Escondido, Calif.

[73] Assignee: The United States of America as represented by the Secretary of the Navy, Washington, D.C.

[22] Filed: Sept. 12, 1974

[21] Appl. No.: 505,306

[52] U.S. Cl. .............. 328/55; 328/155; 343/6.5 LC
[51] Int. Cl.² ........................................ G01S 9/56
[58] Field of Search ................. 343/6.5 LC, 17.1 R; 328/55, 56, 63, 155, 74

[56] References Cited
UNITED STATES PATENTS

| | | | |
|---|---|---|---|
| 3,302,197 | 1/1967 | Humpherys | 343/6.5 LC |
| 3,305,860 | 2/1967 | Humpherys | 343/6.5 LC |
| 3,686,469 | 8/1972 | Clark et al. | 328/155 |
| 3,697,991 | 10/1972 | Ohyama et al. | 343/6.5 LC |
| 3,721,906 | 3/1973 | Geesen et al. | 343/6.5 LC |
| 3,805,173 | 4/1974 | Nakamura et al. | 328/155 |
| 3,815,031 | 6/1974 | Kirner | 328/56 |
| 3,866,221 | 2/1975 | Hikosaka | 343/6.5 LC |

Primary Examiner—T. H. Tubbesing
Assistant Examiner—G. E. Montone
Attorney, Agent, or Firm—R. S. Sciascia; G. J. Rubens; J. W. McLaren

[57] ABSTRACT

A time delay period between a first signal and a delayed second signal is eliminated, restoring the original time relationship between the two signals as derived from a common trigger signal which may vary in its repetition rate. Known, uniform time increments are defined by a constant frequency source producing pulses connectable to both a static shift register having a predetermined number of bits, and a counter having its maximum cumulative count set at the sum of the predetermined number of bits in the shift register and the number of uniform time increments in the time delay period between the first and second signals. The common trigger signal is operative to simultaneously connect the source of clocking pulses to actuate both the shift register and the counter. Upon reception the delayed second signal is connected to the input of the shift register and upon reaching the maximum cumulative count of the counter, the clocking pulses are disconnected from both the shift register and the counter. At the next successive trigger signal, the shift register is reactuated to produce a retimed second signal restored to its original time disposition relative to the first signal.

7 Claims, 2 Drawing Figures

VIDEO RETIMER SYSTEM

BACKGROUND OF THE INVENTION

Two different systems may be required to operate in synchronism with each other to provide two different types of information relative to a single objective. For example, a radar system and an IFF (Identification Friend or Foe) system may be coordinated to provide different types of information with respect to a common target. In such an arrangement, both systems may be rendered synchronously operative by being triggered from a common signal such as the radar trigger signal, for example.

Where two such systems are so coordinated, the radar return signal will provide azimuth, elevation, and range information with respect to a target and the IFF return signal will provide identification of the same target. In its operation, however, the IFF signal frequently is required to undergo encoding operations and in many instances cryptographic procedures must also be completed. These requirements for encoding and/or cryptographic procedures introduce delay into the IFF signal which is not present in the associated radar signal.

It can be readily understood, however, that it is desirable for signals which pertain to the same target to be coordinated and synchronized in time for purposes such as their simultaneous display as may be accomplished in a conventional PPI visual presentation, for example.

Accordingly, it is highly desirable that an appropriate accurate and reliable correction be made to the IFF signal which is delayed by reason of encoding or cryptographic procedures. When the common trigger signal, such as the trigger of the radar system, has a constant pulse repetition frequency, a known amount of such undesired delay that may be due to encoding or cryptographic procedures can be compensated for by providing a "pre-trigger" signal. In the use of such a "pre-trigger" signal the IFF signal is radiated before the radar signal by an amount of time equal to the known delay due to encoding or cryptographic procedures so that the radar return signal and the IFF return signal are synchronized in time upon their return from the same target and the time elapse relative to the initial trigger is the same for both signals, representing range.

In the prior art, two coordinated systems such as radar and IFF systems operating in conjunction with each other have been provided with a selectively variable pre-trigger arrangement which may be used to pre-select and pre-set the amount by which a pre-trigger signal, such as is used to actuate an IFF radiation, for example, will precede the transmitted radar signal. Such selectively preestablished amount of pre-triggering compensates for the delay which may occur by encoding and/or cryptographic procedures at the target before the target, in its transponding function, returns the IFF signal to its origin.

However, as may be readily understood by those skilled and knowledgeable in the pertinent arts, where the trigger signal varies in its pulse repetition frequency, conventional techniques for generating a properly timed pre-trigger signal cannot be employed, since the pulse repetition interval between successive trigger signals will vary. Therefore, the prior art method of generating a pre-trigger signal a pre-calculated amount of time after each preceding trigger signal will not provide the proper desired synchronized time relationships to accurately, reliably, and uniformly compensate for a known or determinable time delay introduced in an IFF signal, for example, by reason of encoding or cryptographic procedures which may take place at the target before the return of the IFF signal.

Thus, there is a need for a system which is capable of retiming a delayed signal relative to another signal so as to restore their original time relationship as derived from a common trigger signal, where such trigger signal may vary in pulse repetition frequency.

SUMMARY OF THE INVENTION

The concept of the present invention contemplates a retiming system for eliminating a time delay period between a first signal and a delayed second signal to restore the original timed relationship between the two signals such as may have been initially derived from a common trigger signal. A source of constant frequency clocking pulses is provided which defines known uniform time increments between successive pulses. Such a source of constant frequency clocking pulses may, for example, be provided by an appropriate clock divided by a convenient integral factor, such as ten, to enhance its overall accuracy.

A suitable means receives the clock pulses, such as a static shift register having a predetermined number of bits so that completion of its entire shifting function will take place in a known or determinable period of time which is the product of the number of bits in the static shift register multiplied by the duration of the aforementioned uniform time increments as defined by the source of constant frequency clocking pulses. (In the context as employed herein a static shift register is intended to connote that type of shift register which functions to shift signals only upon the reception of pulse signals, i.e., when there are no pulse signals, such signal information as may be in the shift register is merely stored until such time as sufficient additional pulse signals are received to complete the shifting operation and cause the shifted signal information to appear at the output of the shift register).

A counter, which preferably has means for selectively setting its maximum cumulative count, is provided and its maximum cumulative count is set at the sum of the predetermined number of bits in the static shift register added to the number of the known uniform time increments in the time delay period which is introduced between the first signal and the delayed second signal by reason of encoding or cryptographic procedures.

When the common trigger signal is generated it is employed to simultaneously connect the source of constant frequency clocking pulses to actuate both the shift register and the counter. Simultaneously, in a conventional manner the common trigger signal causes transmission of both the first signal and the second signal. When the first and second signals are intercepted by a common target as, for example, in the case of coordinated radar and IFF signals, both signals are returned to their point of origin with the elapsed time required for transmission and return of the radar signal being a measurement of range.

The second signal such as an IFF signal, however, is additionally delayed by the amount of time consumed in the course of encoding or cryptographic procedures which take place at the target before it is returned to its point of origin. Upon reception of the delayed second signal it is connected as an input to the shift register and will be shifted down the register in response to received clocking pulses.

When the counter reaches its selectively set maximum cumulative count it operates to disconnect the source of constant frequency clocking pulses from both the counter and the shift register thereby halting further progress of the delayed second signal in the shift register. The delayed second signal therefore remains stored in the shift register until the next successive common trigger signal operates to reconnect the clocking pulses to both the counter and the shift register so that the shift register resumes its shifting operation for that amount of bits which remain to be shifted before providing an output signal.

When the delayed second signal has been shifted through the entire bit capacity of the shift register, it is produced as an output signal and in accordance with the concept and teaching of the present invention such output signal is retimed in a manner that will render it synchronous with the next successive first return signal. That is to say, that each delayed second signal is retimed so as to synchronize it with the next first return signal to restore the original time relationship as derived from the common trigger signal, both reflecting only time elapsed in transmission and return. Accordingly, such signals may be displayed simultaneously in their proper time relationship so that they designate the same target at the same range, for example, as may be provided by the visual display of the PPI type of presentation. If desired as a practical consideration, a very small amount of delay may be introduced between the two related signals so that they can be visually displayed as closely adjacent, rather than overlapping on a PPI cathode ray tube.

In accordance with the concept and teaching of the present invention it is important that the amount of delay which is introduced by reason of encoding or cryptographic processing be known and that the counter have a selectively established maximum cumulative count which comprises the sum of the number of bits in the shift register added to the number of known uniform time increments in the form of clocking pulses which are embraced by the time delay period. In other words, the shift register must have a number of bits so that it can complete one full cycle of operation in a period of time that is shorter than the time required for the counter to complete its full cycle of operation by an amount of time equal to the time delay period which is undesirably introduced between the first and second signals initiated from a common trigger signal.

Additionally, in order for the system of the present invention to function properly in accordance with its concept in response to trigger signals of varying pulse repetition frequency, the counter must be set at a maximum cumulative count representing a time period less than the shortest time period between successive common trigger signals.

Accordingly, it is a primary object of the present invention to provide an improved retiming system for eliminating a time delay between a first signal and a delayed second signal to restore their original time relationship as derived from a common initiating signal.

An equally important object of the present invention is to provide such a retiming system which may be employed in conjunction with systems operating in response to a common trigger signal having variable pulse repetition frequencies.

A further important object of the present invention is to provide such a retiming system which may be selectively set to accommodate predetermined known time delay periods of varying duration.

Another object of the present invention is to provide such a retiming system which can be fabricated as a separate unit and conveniently connected to pre-existing systems to perform the restoration of the desired synchronization between two pre-existing sources of signals.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
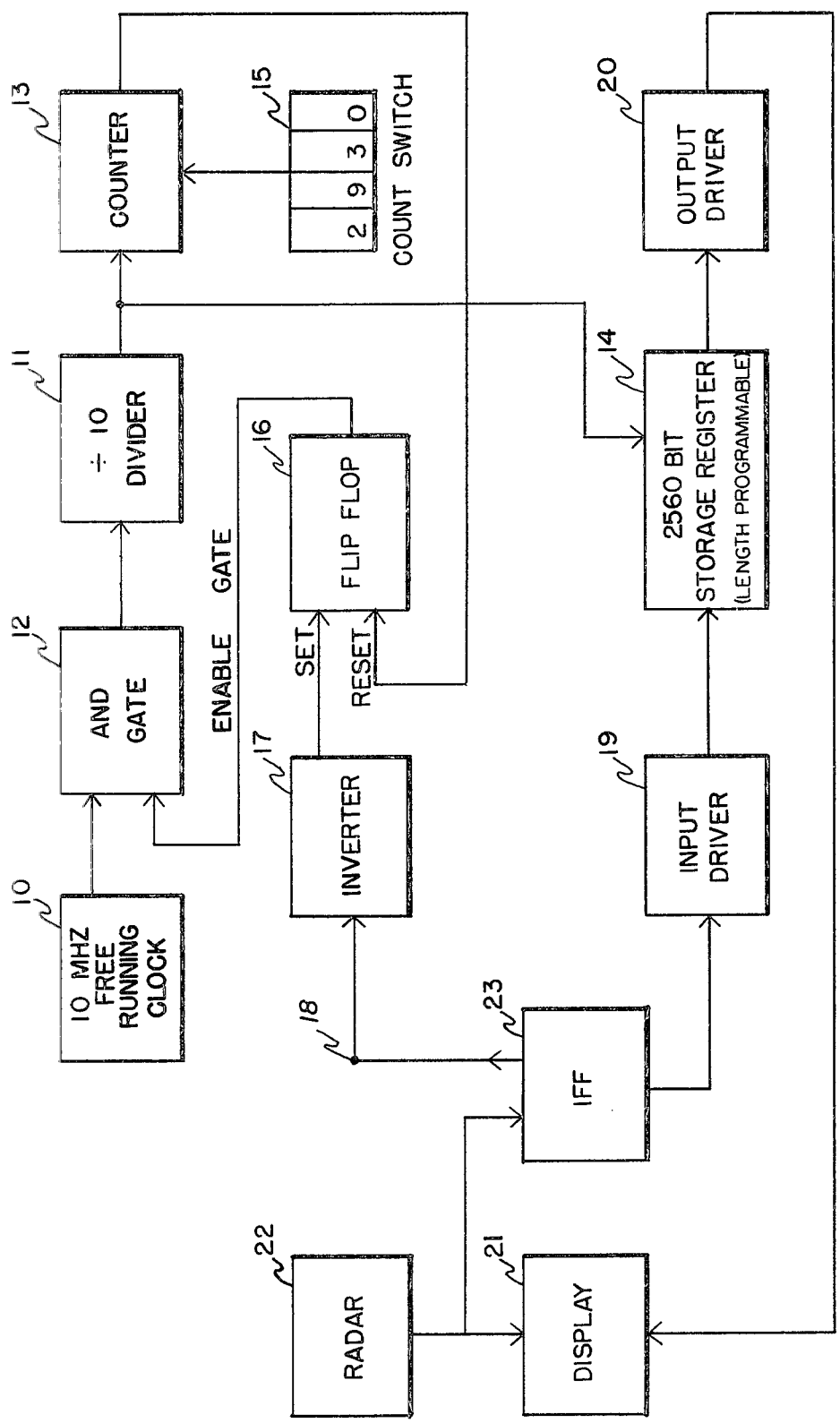
FIG. 1 is a schematic representation of a preferred embodiment of the present invention.

In the embodiment of the present invention illustrated in FIG. 1 a source of constant frequency clocking pulses is provided by a 10MHz free-running clock 10 and a divider 11 which divides the clock pulses by a factor of ten, producing 1MHz pulse outputs which define uniform time increments of 1 microsecond each.

An AND gate 12 is connected between the clock 10 and the divider 11. The output of the divider 11 is connected to both a counter 13 and a storage register 14. The counter 13 is of the type which may be selectively set at any desired cumulative maximum count, such setting being determined by the manual manipulation, for example, of an external count switch 15.

The output of the counter 13 when it reaches its maximum cumulative count (as established by the external switch 15) is connected as the "reset" input to a flip-flop 16. The "set" input to the flip-flop 16 is provided by an inverter 17 which receives its input from an input terminal 18.

The input to the storage register 14 is received from an input driver 19 and, upon such input signal being shifted the entire capacity of the storage register 14, an output is provided to an output driver 20 connected to a display 21 which may take the form of a conventional PPI visual presentation, for example.

In accordance with the concept of the present invention, two sources of related signals may be retimed to restore their original synchronization such as a radar system 22 which is associated and coordinated with an IFF system 23. In typical operation, the radar 22 would initiate a trigger signal which is connected to the display means 21 and also to the IFF system 23. Such repetitive trigger signals are in turn fed from the IFF 23 to the inverter 17 to provide a "set" signal to the flip-flop 16 which enables the AND gate 12.

The result is that, through the described connections, the radar system 22 connects the free-running clock 10 through the AND gate 12 to the divider 11 to provide clocking pulses to both the counter 13 and the register 14. Simultaneously, the trigger signal which initiated in the radar 22 has transmitted a radar signal and an IFF signal from the radar 22 and the IFF 23 simultaneously to a common target, as well as initiating range measurement for the display means 21.

The radar return signal is provided to the display means 21 while the IFF return signal (in its delayed form by reason of encoding or cryptographic procedures completed at the target before its return) is connected to the input driver 19 and fed into the storage register 14 to be shifted down the register 14 for a time period determined by the amount of counts left in the counter 13 before it reaches its pre-set maximum cumulative count.

Upon reaching such pre-set maximum cumulative count the counter 13 provides an output which resets flip-flop 16, disabling the AND gate 12, effectively disconnecting the clock 10 from the divider 11, and therefore stopping the flow of clocking pulses to both the counter 13 and the storage register 14.

In accordance with the concept of the present invention, the delayed second signal received by return of the IFF signal from the target will not have been shifted through the entire bit capacity of the storage register 14 and will remain stored therein until the resumption of its shifting function which occurs at the next successive trigger signal initiated by the radar 22.

Upon the occurence of the next successive trigger signal, the previously described sequence of operations is re-initiated through connection of the radar trigger signal to both the IFF 23 and the inverter 17. The output of inverter 17 resets the flip-flop 16, enabling the AND gate 12, reconnecting the clock 10 to the divider 11 and impressing the constant frequency clocking pulses upon both the counter 13 and the storage register 14. When the maximum shift capacity of the storage register 14 has been reached, it produces an output signal comprising, in this case, a retimed IFF video signal which is connected to the output driver 20 and in turn to the display means 21 for simultaneous presentation together with its associated radar signal representative of the same target.

In accordance with the concept of the present invention the storage register 14 is preferably of a type which has a programmable length, i.e., that its maximum bit capacity may be pre-set at different selected capacities as desired.

Moreover, the concept of the present invention requires that the counter 13 be adapted for selectively setting its maximum cumulative count at the sum of the number of bits of the storage register 14 plus the number of known uniform time increments in the time delay period between the first signal, such as a radar signal, and a delayed second signal, such as a coordinated and associated IFF signal.

Figure 2:
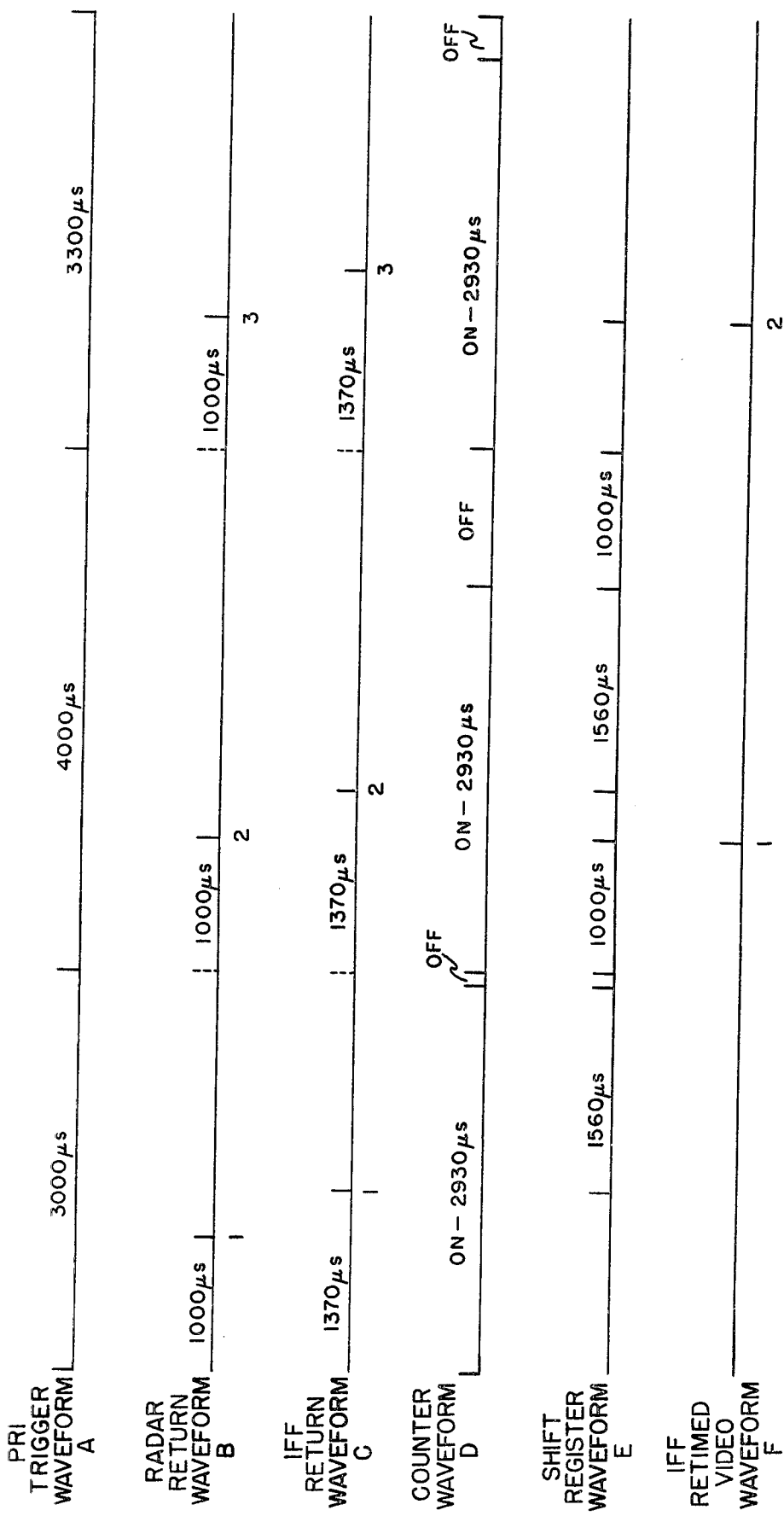
FIG. 2 is an illustration of typical waveforms A through F as developed in the operation of the embodiment represented in FIG. 1.

The manner in which the various signals developed in the operation of an embodiment of the present invention are related in time disposition may be best appreciated by reference to waveforms A through F of FIG. 2. Waveform A of FIG. 2 graphically illustrates the varying pulse repetition intervals between successive trigger signals such as may be initiated by the radar 22 of FIG. 1. It will be seen from waveform A of FIG. 2 that successive trigger signals are displaced by the time intervals of 3000 microseconds, 4000 microseconds and 3300 microseconds, successively.

It is assumed for purposes of illustration that the radar signal return from a particular target is received 1000 microseconds after the radar trigger of waveform A and such radar return signals are illustrated by waveform B of FIG. 2. The radar return signals of waveform B are labeled 1, 2, and 3, successively to designate three successive returns from the same target which represent the same range though the trigger signals were initiated at different pulse repetition intervals as illustrated in waveform A.

Assuming that encoding and cryptographic processing requires 370 microseconds at the target, for example, it will be appreciated that the IFF returns as illustrated by waveform C of the first, second, and third IFF interrogations of the same target as represented by the radar returns of waveform B will be delayed in each instance by an additional amount of 370 microseconds for a total elapsed time from the trigger of 1370 microseconds.

Further, it will be recalled that the counter 13 of the embodiment illustrated in FIG. 1 was actuated simultaneously with the radar trigger and began to count at that time toward its preset maximum cumulative count, which for purposes of illustration may be designated as 2930 in this instance. This maximum cumulative count which is preset into the counter 13, it will be recalled, is the sum of the number of bits in the shift register 14 illustrated in the embodiment of FIG. 1 added to the number of known uniform time increments representative of the time delay period between the first and second signals. Since the time delay period is 370 microseconds, the storage register 14 must have a capacity of 2560 bits so that the 2560 bits added to the 370 microsecond time delay equals the maximum cumulative count of 2930 which is pre-established in the counter 13 by manual manipulation, for example, of the count switch 15.

Waveform D of FIG. 2 illustrates the sequence in which the counter 13 is turned on for the initial 2930 microseconds of each pulse repetition interval and then turned off for the remainder of each pulse repetition interval by reason of achieving its maximum cumulative account and producing an output signal which resets the flip-flop, effectively disconnecting the source of constant frequency clocking pulses from both the counter 13 itself and the storage register 14.

It will be recalled from the description of the operation of the embodiment of FIG. 1 that the return IFF signal is connected from the IFF equipment 23 to the input driver 19 and thence to the storage register 14. The storage register 14, however, will have already received 1370 clocking pulses since the clocking pulses are received at a frequency representing one microsecond time period each and the IFF return signal is delayed 1370 microseconds. Thus, the reception of the IFF return signal by the storage register 14 is disposed in a delayed time relationship coincident in waveform E with the IFF return of waveform C.

However, the counter 13 runs for a maximum cumulative count of 2930 microseconds. Therefore, the shift register 14 will receive 1560 clocking pulses after its reception of the IFF return signal. Since the maximum bit capacity of the storage register 14 has been predetermined to be 2560 bits, it still must be clocked 1000 bits or 1000 microseconds.

Such additional clocking is not resumed, however, until the next successive trigger at which time 1000 additional clocking pulses representative of 1000 microseconds completes the maximum capacity of the storage register, producing a retimed IFF video signal as represented by waveform F of FIG. 2. It should be noted that the retimed IFF video No. 1 of waveform F is coincident with the radar return signal labeled No. 2 and that, similarly, the IFF retimed video signal No. 2 of waveform F has been retimed to be coincident with signal No. 3 of the radar return B.

Thus, each IFF signal is retimed to be synchronous with the next successive radar signal. Moreover, such retiming has been completed to synchronize the radar and IFF signals notwithstanding the fact that both the radar and IFF signals transmitted to the same target were initiated at varying pulse repetition intervals.

Though radar and IFF systems are schematically represented in the illustration of FIG. 1, these equipments are not elements of the invention and are shown for purposes of explanation only. The present invention is an operative combination which may be advantageously connected to function with any systems where an undesired delay is introduced in one of two signals originating with a desired time relationship relative to a common timing or trigger signal.

Those skilled and knowledgeable in the pertinent arts will readily recognize the advantages of the present invention by reason of which it is conveniently adaptable to accommodate widely different delay periods which are caused to occur between two synchronously related signals.

Additionally, the concept and teaching of the present invention is such that renders it conveniently useable to most existing equipments without requiring any major change or redesign of the systems which it is employed to give effect to desired synchronized time relationships.

Obviously many modifications and variations of the present invention are possible in the light of the above teachings. It is therefore to be understood that within the scope of the appended claims the invention may be practiced otherwise than as specifically described.

What is claimed is:

1. A retiming system for eliminating a time delay period between a first signal and a delayed second signal to restore their synchronous relationship as derived from a repetitive common trigger signal comprising:
    a source of constant frequency clocking pulses defining known uniform time increments;
    a static shift register having a predetermined number of bits;
    a counter having means for selectively setting its maximum cumulative count at the sum of said predetermined number of bits and the number of said known uniform time increments in said time delay period;
    means responsive to said common trigger signal for simultaneously connecting said source of constant frequency clocking pulses to actuate said shift register and said counter;
    means connecting the subsequently occurring said delayed second signal to the input of said shift register;
    means responsive to the selectively set maximum cumulative count of said counter for simultaneously disconnecting said source of constant frequency clocking pulses from said shift register and said counter leaving said delayed second signal in said shift register with a remaining number of unshifted bits representative of the time interval between said common trigger signal and said first signal; and
    means receiving the output of said shift register after its reactuation in response to the next successive trigger signal, shifting said remaining number of unshifted bits for generating a retimed second signal in synchronism with the next successive first signal.

2. A retiming system as claimed in claim 1 including means connected to receive said first signal and said retimed second signal for displaying both said signals simultaneously.

3. A retiming system as claimed in claim 1 wherein the time period between successive common trigger signals is variable.

4. A retiming system as claimed in claim 1 wherein the setting of said maximum cumulative count of said counter represents a time period of less than the shortest time period between successive common trigger signals.

5. A retiming system as claimed in claim 1 wherein said source of constant frequency clocking pulses comprises a clock having its output divided by a frequency divider to produce said known uniform time increments.

6. A retiming system as claimed in claim 5 wherein said means responsive to said common trigger is an AND gate connected between said clock and said frequency divider.

7. A retiming system as claimed in claim 6 wherein said means responsive to the selectively set maximum cumulative count of said counter is a flip-flop for disabling said AND gate.

* * * * *